United States Patent [19]

Sparenberg et al.

[11] Patent Number: 5,064,506
[45] Date of Patent: Nov. 12, 1991

[54] PACKED COLUMN WITH BUILT-IN TEMPERATURE MEASURING POINTS

[75] Inventors: Dieter Sparenberg, Ratingen; Rolf Ullrich, Moenchengladbach; Herbert Nuding, Ratingen, all of Fed. Rep. of Germany

[73] Assignee: Henkel Kommanditgesellschaft auf Aktien, Duesseldorf-Holthausen, Fed. Rep. of Germany

[21] Appl. No.: 392,336

[22] Filed: Aug. 11, 1989

[30] Foreign Application Priority Data

Aug. 13, 1988 [DE] Fed. Rep. of Germany ....... 3827560

[51] Int. Cl.5 .............................................. B01D 3/42
[52] U.S. Cl. ....................................... 203/2; 202/160; 202/242; 261/148; 374/110; 374/166
[58] Field of Search ...................... 202/158, 160, 242; 203/2, DIG. 18; 374/110, 166, 141, 179, 185; 261/148

[56] References Cited

U.S. PATENT DOCUMENTS

| 2,878,355 | 3/1959 | McDonald | 374/110 |
| 3,071,520 | 1/1963 | Smalling | 202/160 |
| 3,192,770 | 7/1965 | Bash | 374/110 |
| 3,653,262 | 4/1972 | Ehrenfried et al. | 374/166 |
| 3,773,627 | 11/1973 | Weber et al. | 202/160 |
| 3,830,698 | 8/1974 | Kleiss | 202/160 |
| 3,955,419 | 5/1976 | Barton et al. | 374/166 |
| 4,024,027 | 5/1977 | Boyd | 203/99 |
| 4,025,397 | 5/1977 | Green | 202/160 |
| 4,186,605 | 2/1980 | Bourigault | 374/166 |
| 4,228,684 | 10/1980 | Templin | 374/178 |
| 4,348,373 | 9/1982 | Schoubge | 423/522 |
| 4,355,908 | 10/1982 | Weisser et al. | 374/39 |
| 4,385,197 | 5/1983 | Schwagerman | 374/110 |
| 4,627,744 | 12/1986 | Brixy et al. | 374/179 |
| 4,724,428 | 2/1988 | Brown, Jr. | 374/179 |
| 4,733,975 | 3/1988 | Romanetsky et al. | 374/144 |

Primary Examiner—Virginia Manoharan
Attorney, Agent, or Firm—Ernest G. Szoke; Wayne C. Jaeschke; Daniel S. Ortiz

[57] ABSTRACT

A packed column with temperature sensors to measure the temperature profile longitudinally and transversely of the column without the temperature profile or flow conditions being affected by the measuring arrangement. The temperature measuring leads (10) are introduced into the upper part of a column section (1) through a single tube (12) and, are routed to the desired measuring points (8) through the peripheral zone between the packing (9) and the column wall (2).

4 Claims, 3 Drawing Sheets

PACKED COLUMN WITH BUILT-IN TEMPERATURE MEASURING POINTS

BACKGROUND OF THE INVENTION

1. Field of the Invention

The invention is a rectification column, comprising a packing and built-in temperature measuring points each with a lead, for determining the temperature profile longitudinally and/or transversely of the column. The invention includes a method for making the column.

A rectification column is used for separating liquid mixtures comprising components with different boiling points, by countercurrent distillation or rectification. In a rectification column, the descending liquid and ascending vapor contact one another in a countercurrent manner. The column is provided with packing which can comprise baffles, metal honeycombs or the like, shaped in a certain way, and which, through their shape, provide for constant, uniform intermixing and interpenetration of the streams as they contact one another.

In the rectification column, heat exchange takes place between the descending liquid and the ascending vapor. The component of higher boiling point present in the vapor is condensed in the descending liquid and the heat of condensation, released in the process, is used to vaporize the component of lower boiling point in the liquid. In this way, the component of lower boiling point accumulates in the vapor and the component of higher boiling point accumulates in the liquid. In addition to the inter-mixing, interpenetration and contact of the vapor and liquid, another important requirement in rectification is of course the maintenance of a certain temperature profile in the column. Losses of heat through the column wall result in cooling of the column wall and hence in an increase in the reflux which, in turn, results in disturbance of the equilibrium of the column. In addition to adiabatic operation, knowledge of the temperature profile inside the column is necessary for optimizing the process.

2. Statement of Related Art

A multiplicity of temperature measuring points are required for determining the temperature profile over the length and the cross-section of a column. In practice, the individual measuring points are either introduced into the interior of the column from outside through openings in the column wall or have been placed in the column from inside through a central tube extending longitudinally through the column. Both systems have disadvantages.

Where the temperature measuring points are introduced from outside through openings in the column wall, each measuring point can only be introduced into the column as far as the periphery of the packing present in the column. The measuring point can only measure the temperature in the peripheral zone of the column. If interior points are to be measured, holes have to be drilled in the packing which can result in damage to the packing and in irregularities in the flow conditions in this zone. Subsequent changes in the arrangement of the temperature measuring points involves considerable expense because a corresponding tube has to be welded into the column and acceptance by a safety authority is required. Another disadvantage of the construction with measuring points introduced into the column from outside, through holes in the column wall, is that the heat insulation surrounding rounding the column has to be removed at each measuring point. Accordingly, each measuring point forms a heat bridge with corresponding heat losses. In addition, removing or replacing the heat insulation material involves considerable extra work at the assembly stage.

Because of the disadvantages involved in use of measuring points introduced from outside through openings in the column wall, attempts have been made to arrange the temperature measuring leads to the particular measuring points in the column, through an internal central tube. In this case, however, temperature measurement is possible only at the outer peripheral zone of the inner tube, not in the main flow regions of the packing. In addition, the full-length inner tube, which can occupy a substantial portion of the column cross-section, can necessitate a correspondingly larger column diameter at extra expense, and can impair the temperature and flow conditions in the column.

The problem addressed by the present invention is to provide a packed column, more particularly a packed rectification column, in which the temperature profile can be measured at any point of the column cross-section over the entire length of the column without the heat insulation, the column wall or the column packing having to be interrupted or damaged and without need for a space consuming central tube with the disadvantages it involves in terms of heat and flow.

DESCRIPTION OF THE INVENTION

According to the invention a packed column with built-in temperature measuring points each having a lead, is provided. The leads of all the temperature measuring points extend into the column bundled together through a single inlet tube per column section. From the inlet tube, each individual lead is routed along the column wall in the peripheral zone between the packing and the column wall to the level of the particular temperature measuring point and then to the particular transverse location during assembly of the packing.

By virtue of the invention, all the temperature measuring lines per column section can be introduced into the column through a single inlet or central tube. Only a single passage is formed through the column wall, so that the column wall and its heat insulation are only interrupted at this point. The assembly work involved and the heat loss produced by the measuring arrangement are correspondingly minimal.

According to the invention, the leads of the temperature measuring points are routed directly to the desired measuring point, which may be situated at any point of the column. For example, the leads can be routed within the column in the peripheral zone between the packing and the column wall, through conduits approximately 1.6 mm in diameter. The temperature can be measured at any desired point within the packing or column. It is thus possible to eliminate both peripheral zone influences and also significant disturbances produced by the measuring arrangement itself.

According to the invention, it is possible to provide any number of permanently active measuring points or even reserve measuring points to be activated as required. In particular, the temperature may be specifically measured in a certain region of the column or the temperature profile may be measured over a certain column cross-section by the arrangement of corresponding measuring points and leads. Changes in the distribution of measuring points may readily be made.

However, the measuring points and their leads should be directly introduced during installation of the packing. They can only be removed during dismantling of the packing. Whereas the central tube previously used extended right through the column parallel to its geometric axis, the inlet tube according to the invention is a passage through the column wall which does not affect the interior of the column at all.

In another embodiment of the invention, the inlet tube is provided at the upper end of the column or at the upper end of a particular column section. In this way, a lead belonging to each individual measuring point can be routed through in the peripheral zone between the packing and the column wall when the individual packing sections are being placed on one another so that the measuring arrangement as a whole is actually functional as soon as the column packing has been assembled.

The present invention also relates to a method for fabricating a column which is characterized in that the measuring points are arranged during assembly of the packing and the leads are installed integrated in the peripheral zones between the packing and the column wall. In this way, the measuring points and their leads can be installed step-by-step together with the packing, so that there is no need for subsequent work, such as the welding in of tubes. In addition the temperature can be measured at any point of the column cross-section without peripheral zone influences.

BRIEF DESCRIPTION OF THE DRAWINGS

An example of an embodiment of the invention is described in detail with reference to the accompanying drawings, wherein.

DETAILED DESCRIPTION OF THE INVENTION

Figure 1:
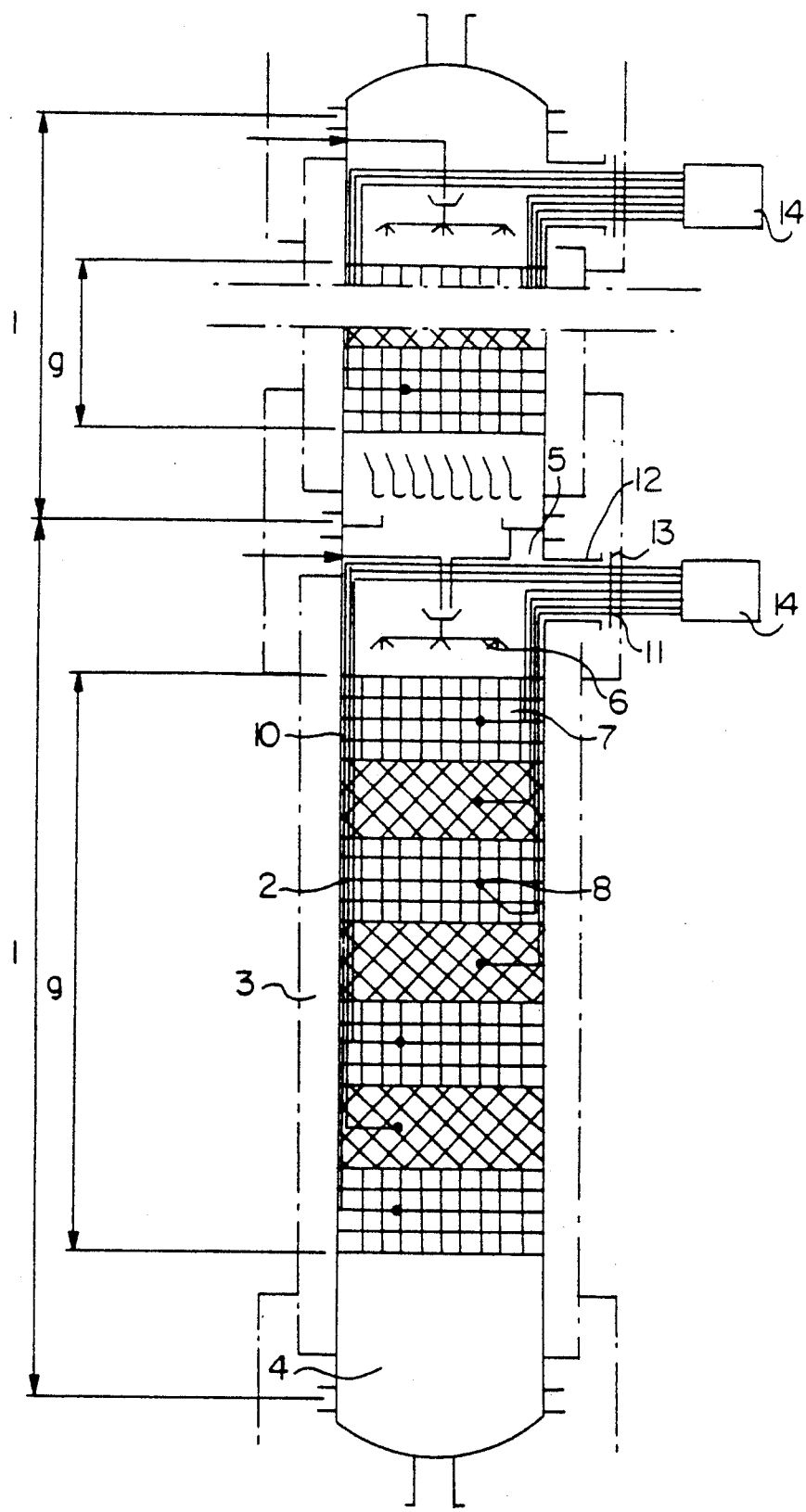
FIG. 1 is a longitudinal section through a rectification column.

The rectification column section denoted by the reference 1 in FIG. 1 has a column wall 2 surrounded by heat insulation 3 with a symbolized lower column section 4 and an upper column section 5 of which the respective functions are to introduce and remove the composition to be separated. The column section 1 has a number of packing elements 7 stacked loosely on one another.

Figure 2:
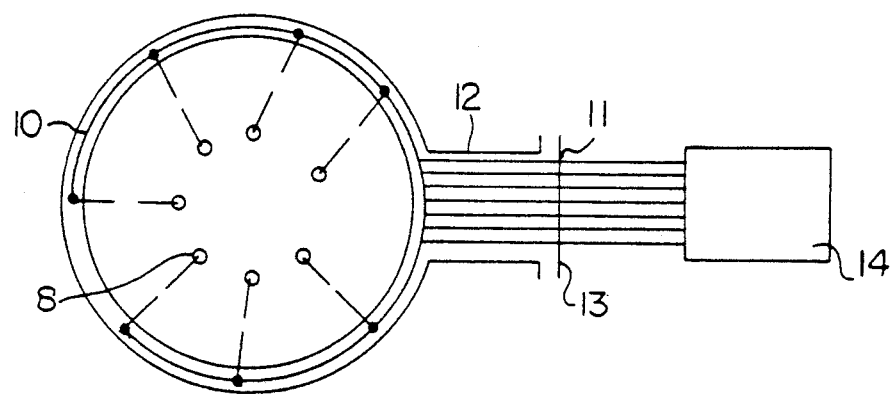
FIG. 2 is a cross-section through a rectification column.
Figure 3:
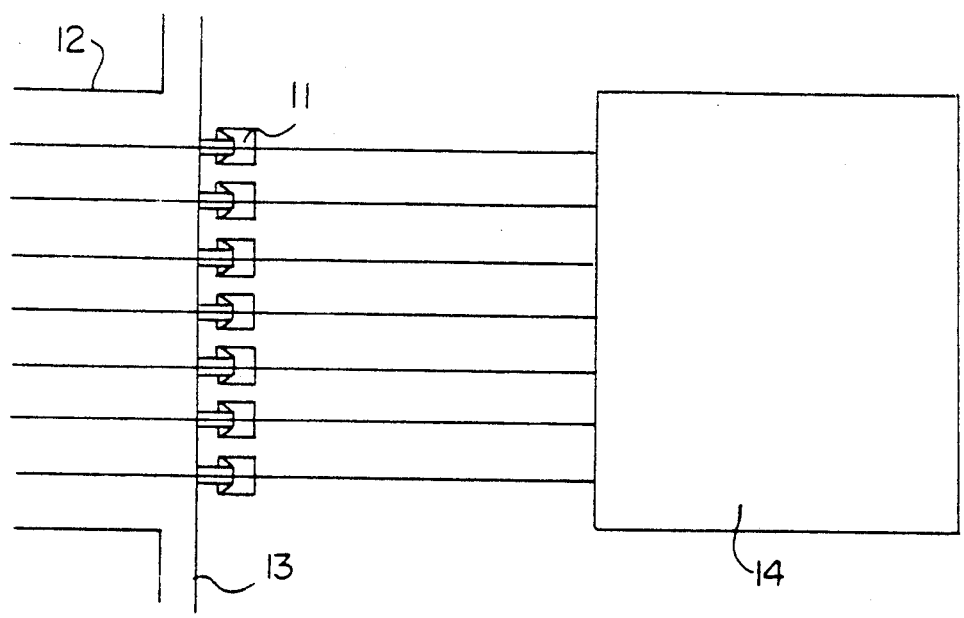
FIG. 3 shows individual passages for leads.

As shown in FIGS. 1 and 2, measuring points 8 are arranged over the length and cross-section of the column section 1. The measuring points 8 with the leads 10 connected thereto, are installed during the assembly of the packing 9 in the column section 1. During assembly of the packing 9, the leads 10 are arranged in the peripheral zone between the packing 9 and the column wall 2 where they do not affect the flow conditions or the temperature profile in the column by virtue of the small diameter, for example 1.6 mm, of the individual leads 10.

The leads 10, which gradually increase in number in the upward direction as the packing 9 is stacked in the column, are routed as far as the upper column section 5 in a more or less random distribution in the peripheral zone between the packing and the column wall and are carried outwards in bundled form through individual screw connections 11 in the flange 13 of the tube 12. It can be seen that the column wall 4 and its heat insulation 5 are only affected at the position intended for the tube 12 so that a corresponding heat bridge can only be formed at this point.

We claim:

1. A rectification column, comprising: a column section having a wall, packing arranged in the column section, a plurality of temperature sensing means arranged in the column section during installation of the packing, to contact contents of the column, at a point remote from the column wall, at which point the temperature is to be sensed, each temperature sensing means connected to a lead means to connect the temperature sensing means to a means outside of the column through a single lead means inlet tube, each lead means extends laterally from the point at which the temperature sensing means contacts the contents of the column to the column wall, at the column wall, each lead means is arranged in the peripheral zone between the packing and the column to the single lead means inlet tube in the section and passes through the lead means inlet tube and an inlet tube closure means to the outside of the column section.

2. A column as claimed in claim 1, wherein the inlet tube (12) is arranged near the upper end of the column section (1).

3. A method of installing a plurality of temperature sensing means, having leads, in a packed rectification column section having temperature sensing means, located at temperature sensing positions away from a column wall, which comprises:
   (a) locating each temperature sensing means at a temperature sensing position in the column, away from the column wall;
   (b) arranging the lead of each temperature sensing means to extend from the temperature sensing position laterally to the column wall and along the column wall to pass from the column section through a single lead means inlet tube in the section;
   (c) arranging the column packing around each temperature sensing means in the column section so that the leads along the column wall are arranged in the peripheral zone between the packing and the column wall.

4. A method of claim 3 wherein the leads are arranged to extend along the column wall in the peripheral zone between the packing and the column wall in an upward direction to the single lead means inlet tube located near an upper end of the column section.

* * * * *